US009185854B2

(12) United States Patent
Galal et al.

(10) Patent No.: US 9,185,854 B2
(45) Date of Patent: Nov. 17, 2015

(54) CONFIGURABLE FLUID RECEPTACLES WITH INTERNAL BLADDERS

(71) Applicants: Omar Galal, Mansfield, MO (US); Tawfik Sharkasi, South Barrington, IL (US)

(72) Inventors: Omar Galal, Mansfield, MO (US); Tawfik Sharkasi, South Barrington, IL (US)

(*) Notice: Subject to any disclaimer, the term of this patent is extended or adjusted under 35 U.S.C. 154(b) by 134 days.

(21) Appl. No.: 13/969,987

(22) Filed: Aug. 19, 2013

(65) Prior Publication Data

US 2015/0048082 A1 Feb. 19, 2015

(51) Int. Cl.
*E03B 11/02* (2006.01)
*B65B 1/04* (2006.01)
*A01G 9/02* (2006.01)
*B65D 8/00* (2006.01)
*B65D 8/02* (2006.01)
*B65D 6/24* (2006.01)
*B65D 21/08* (2006.01)
*E03B 3/03* (2006.01)
*E04B 1/94* (2006.01)

(52) U.S. Cl.
CPC *A01G 9/02* (2013.01); *B65D 11/06* (2013.01); *B65D 11/08* (2013.01); *B65D 11/1873* (2013.01); *B65D 21/083* (2013.01); *E03B 3/03* (2013.01); *E04B 2001/949* (2013.01); *Y10T 137/0318* (2015.04)

(58) Field of Classification Search
CPC .... B65D 21/02; B65D 21/0215; B65D 90/08; B65D 90/024; B65D 90/205; B65D 88/52; B65D 9/34; B65D 9/12; E03B 3/02; E03B 3/03; E03B 1/04; E04B 1/04; E04B 1/34; E04B 2001/949

USPC ......... 220/4.16, 4.12, 4.04, 1.5, 1.6, 9.1, 9.2, 220/495.06, 565, 720–723, 495.05, 23.2, 220/219, 223, 612, 4.33, 4.34, 688; 217/4, 217/12 R, 13, 65; 137/357; 210/232, 170, 210/474; 52/12, 169.7, 16; 141/86, 2, 341
See application file for complete search history.

(56) References Cited

U.S. PATENT DOCUMENTS

| | | | | |
|---|---|---|---|---|
| 1,981,568 | A | * | 11/1934 | Owen .......................... 220/4.12 |
| 2,373,221 | A | * | 4/1945 | Blaylock et al. ............. 220/4.15 |
| 2,437,058 | A | | 3/1948 | Waters |
| 3,327,883 | A | * | 6/1967 | Buhler ......................... 220/4.12 |
| 3,409,714 | A | * | 11/1968 | Strugar, Jr. .................... 264/242 |
| 3,410,441 | A | * | 11/1968 | Rhyne .......................... 220/4.28 |
| 3,692,201 | A | * | 9/1972 | Garduna ...................... 217/12 R |
| 3,977,569 | A | * | 8/1976 | Scholle ......................... 222/105 |

(Continued)

*Primary Examiner* — Mickey Yu
*Assistant Examiner* — Gideon Weinerth
(74) *Attorney, Agent, or Firm* — Sutherland Asbill & Brennan LLP

(57) ABSTRACT

A configurable fluid retention apparatus includes a plurality of detachable panels configured to interlock with each other to form an outer structure of the configurable fluid retention apparatus, an internal bladder secured to at least one of the plurality of detachable panels, and comprising an intake connection, an outlet connection, and an air relief device. An intake valve is fluidly coupled to the internal bladder at the intake connection and configured to allow unidirectional fluid flow. Each of the plurality of detachable panels includes a plurality of interlock members and interlock gaps of substantially equal widths positioned along a perimeter of each detachable panel, a plurality of variable connection openings extending through the body of each detachable panel, and the orientation panel comprises an orientation portion comprised of two interlock members extending substantially perpendicular to each other.

18 Claims, 9 Drawing Sheets

(56) References Cited

U.S. PATENT DOCUMENTS

| | | | | |
|---|---|---|---|---|
| 4,718,452 | A * | 1/1988 | Maitland | 137/592 |
| 4,996,760 | A * | 3/1991 | Coleman | 29/454 |
| 5,272,835 | A * | 12/1993 | Stern | 47/79 |
| 5,564,599 | A | 10/1996 | Barber et al. | |
| 5,680,955 | A * | 10/1997 | Schutz | 220/1.6 |
| 5,730,179 | A * | 3/1998 | Taylor | 137/357 |
| 6,401,953 | B2 | 6/2002 | Kofod | |
| 6,526,699 | B1 * | 3/2003 | Foglio, Sr. | 52/15 |
| 6,955,273 | B2 * | 10/2005 | Hartwall | 220/1.6 |
| 6,966,333 | B1 * | 11/2005 | Kuehneman | 137/357 |
| 7,478,734 | B2 * | 1/2009 | Vargas | 220/4.34 |
| 7,909,000 | B1 * | 3/2011 | O'Neill et al. | 119/61.1 |
| 8,132,686 | B2 | 3/2012 | Buonerba et al. | |
| 8,146,771 | B1 | 4/2012 | Segeleon | |
| 8,474,195 | B1 * | 7/2013 | Anchondo | 52/168 |
| 2003/0085226 | A1 * | 5/2003 | Manning | 220/4.31 |
| 2005/0257433 | A1 * | 11/2005 | Dussault et al. | 52/12 |
| 2006/0011173 | A1 * | 1/2006 | Davis et al. | 123/520 |
| 2006/0101723 | A1 * | 5/2006 | Baeta | 52/16 |
| 2007/0235458 | A1 * | 10/2007 | Hewkin | 220/612 |
| 2008/0159889 | A1 * | 7/2008 | Exner et al. | 417/423.1 |
| 2009/0065504 | A1 * | 3/2009 | Vos et al. | 220/212 |
| 2009/0114655 | A1 * | 5/2009 | Weatherstone et al. | 220/495.05 |
| 2010/0032053 | A1 * | 2/2010 | Chong et al. | 141/10 |
| 2010/0096390 | A1 * | 4/2010 | Allan | 220/565 |
| 2010/0200482 | A1 * | 8/2010 | Perlatti | 210/170.03 |
| 2010/0320203 | A1 * | 12/2010 | Moodie et al. | 220/9.3 |
| 2011/0290827 | A1 * | 12/2011 | Gilpatrick | 222/333 |
| 2012/0024847 | A1 * | 2/2012 | Marett et al. | 220/9.2 |
| 2012/0279583 | A1 * | 11/2012 | Forrest | 137/357 |
| 2013/0233862 | A1 * | 9/2013 | Morris | 220/565 |
| 2013/0248016 | A1 * | 9/2013 | Blair | 137/357 |
| 2013/0263967 | A1 * | 10/2013 | Woodruff | 141/1 |
| 2014/0097182 | A1 * | 4/2014 | Sheesley | 220/1.6 |
| 2014/0346099 | A1 * | 11/2014 | Brantley et al. | 210/127 |
| 2015/0008229 | A1 * | 1/2015 | Ringdahl | 220/565 |
| 2015/0135613 | A1 * | 5/2015 | Kim et al. | 52/173.1 |

* cited by examiner

US 9,185,854 B2

CONFIGURABLE FLUID RECEPTACLES WITH INTERNAL BLADDERS

TECHNICAL FIELD

The present specification generally relates to fluid receptacles and, more specifically, configurable fluid receptacles with internal bladders.

BACKGROUND

Fluid tanks may be bulky, heavy, and cumbersome to handle, leading to difficulty in transporting and/or shipping the fluid tank. Additionally, fluid tanks may have fixed volumes, which may cause users to replace fluid tanks depending on changing needs. Finally, fluid tanks may not be aesthetically pleasing, increasing the difficulty of incorporating fluid tanks positioned within outdoor landscapes or on rooftop surfaces, for example.

Accordingly, alternative fluid receptacles may be desired.

SUMMARY

In one embodiment, a configurable fluid retention apparatus includes a plurality of detachable panels comprising an orientation panel, the plurality of detachable panels configured to interlock with each other to form an outer structure of the configurable fluid retention apparatus, an internal bladder positioned within an interior cavity of the configurable fluid retention apparatus and secured to at least one of the plurality of detachable panels, and the internal bladder comprising an intake connection, an outlet connection, and an air relief device. An intake valve is fluidly coupled to the internal bladder at the intake connection and configured to allow unidirectional fluid flow, and an outlet valve fluidly coupled to the internal bladder at the outlet connection, the outlet valve passing through one of the plurality of detachable panels. Each of the plurality of detachable panels includes a plurality of interlock members and interlock gaps of substantially equal widths positioned along a perimeter of each detachable panel, the interlock members extending from a body of the detachable panel, a plurality of variable connection openings extending through the body of each detachable panel, and the orientation panel comprises an orientation portion comprised of two interlock members extending substantially perpendicular to each other, such that a longitudinal edge of one of the interlock members forms a portion of a bottom surface of the configurable fluid retention apparatus.

In another embodiment, a method for transporting a fluid includes collecting a fluid in a feeding reservoir, directing flow of the fluid using a fluid delivery apparatus, and receiving the fluid in a fluid retention apparatus. The fluid retention apparatus includes a plurality of detachable panels assembled to form an interior cavity, wherein one of the plurality of detachable panels comprises an orientation portion that ensures the detachable panel is oriented in a predetermined configuration, and strengthening members positioned between adjacent detachable panels. The fluid retention apparatus further includes an internal bladder comprising an air relief device, an intake connection, and an outlet connection, the internal bladder positioned in the interior cavity and configured to retain the liquid, an intake check valve fluidly coupled to the fluid delivery apparatus and the internal bladder, and an outlet valve fluidly coupled to the internal bladder and a spigot configured to adjust flow speed of the fluid. The fluid is unable to flow into the internal bladder when the internal bladder is at a predetermined capacity.

In another embodiment, a configurable fluid retention apparatus includes three stackable rigid panels, each rigid panel having a body with an exterior face and an interior face, interlock members each having two opposing openings of equal diameter, a supporting rib structure on the interior face, and two variable valve position openings extending through the body of each stackable panel. The exterior face of each stackable panel resembles wood grain and one of the rigid panels comprises an orientation corner comprised of two interlock members perpendicular to each other that orient the rigid panel in a predetermined configuration. The configurable fluid retention apparatus further includes a strengthening member inserted through the opposing openings of the interlock members along one side of two adjacent rigid panels, a flexible internal bladder attached to two of the stackable rigid panels, an intake check valve fluidly coupled to the internal bladder and passing through the body of one of the rigid panels, and an outlet valve fluidly coupled to the internal bladder and passing through the body of one of the rigid panels. The configurable fluid retention apparatus further includes a fluid delivery apparatus fluidly coupled to the intake check valve, and a feeding reservoir fluidly coupled to the intake check valve.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
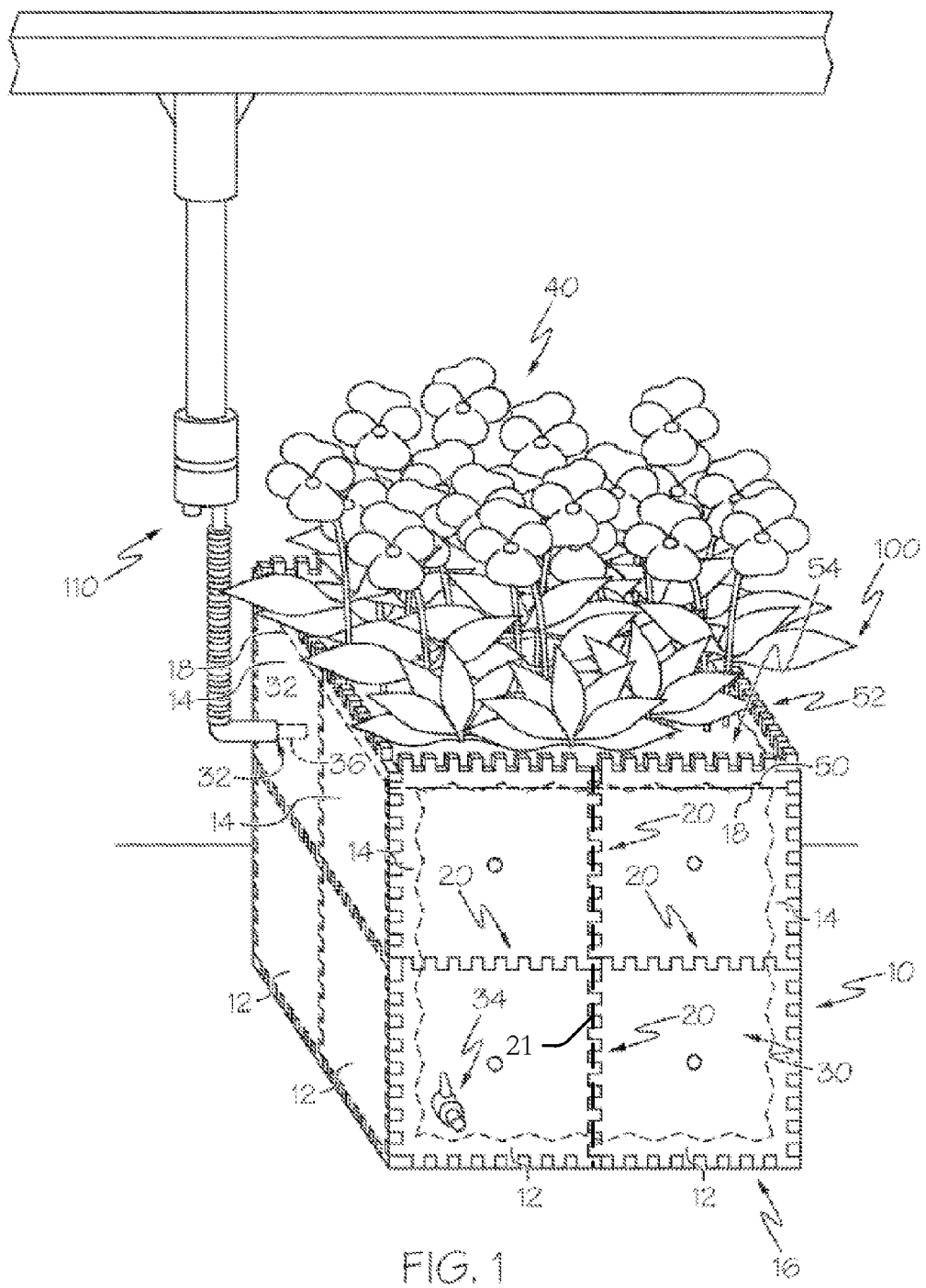
FIG. 1 depicts a schematic perspective view of one embodiment of a configurable fluid retention apparatus comprised of a plurality of detachable panels according to one or more embodiments shown and described herein.

Referring generally to FIG. 1, embodiments described herein are directed to configurable fluid receptacles with internal bladders. The configurable fluid receptacles described herein are comprised of detachable structural panels of various geometries that can be configured to form structures of different shapes and sizes. The detachable structural panels may be rectangular for example and may be configured to form fluid receptacles that also include, for example, a raised garden, a shelving unit, or a lawn chair. The detachable structural panels may further be curvilinear and configured to form, for example, a structure representing a wine barrel. The configurable fluid receptacles further comprise an expandable internal bladder with an inlet that may pass through at least one of the detachable structural panels. The expandable internal bladder receives and retains fluid delivered to the expandable internal bladder from an exterior source, for example a rain gutter downspout. The expandable internal bladder is fluidly coupled to an outlet, which may comprise a spout, that may pass through one of the detachable structural panels. The outlet is operable to remove fluid from the expandable internal bladder. The expandable internal bladder may additionally include air relief valves for efficient fluid flow into and out of the expandable internal bladder, as well as attachment means for attaching the expandable internal bladder to interior surfaces of the structure formed by the detachable structural panels. Strengthening members, such as metal or plastic rods, may be inserted through interlocking members of the detachable structural panels for additional structural integrity. Various embodiments of configurable fluid receptacles with internal bladders will be described in more detail herein.

Referring now to FIG. 1, one embodiment of a configurable fluid receptacle 100 is depicted. The configurable fluid receptacle 100 includes a plurality of detachable structural panels 10 that are connected to one another via interlocking members 20 to form the configurable fluid receptacle 100. The plurality of detachable structural panels 10 includes orientation panels 12, side panels 14, bottom panels 16, and top panels 18. In some embodiments, the configurable fluid receptacle 100 may include strengthening members 21 inserted through interlocking members 20 between adjacent detachable structural panels 10, as discussed herein. The configurable fluid receptacle 100 further includes an expandable internal bladder 30 with an inlet 32 and an outlet 34. The configurable fluid receptacle 100 may include a valve 36, such as a check valve, fluidly coupled to the inlet 32 of the expandable internal bladder 30. The valve 36 may allow unidirectional fluid flow into or out of the expandable internal bladder 30. The valve 36 may also be fluidly coupled to a fluid delivery source 110, depicted in FIG. 1 as an expandable hose attached to a gutter downspout. The fluid delivery source 110 may deliver fluid, such as a liquid or a gas, to the configurable fluid receptacle 100. In the illustrated embodiment, the fluid delivery source 110 may deliver rain water collected in an attached gutter to the configurable fluid receptacle 100 as the rain water travels through the fluid delivery source 110 due to gravity. Other embodiments may use mechanical pumps or other methods of forced fluid delivery to deliver fluid to the configurable fluid receptacle 100. The valve 36 may be mounted on the configurable fluid receptacle 100 or may pass through one of the plurality of detachable structural panels 10, as shown in FIG. 1. The expandable internal bladder 30 may further include attachment portions to attach to internal surfaces of the plurality of detachable structural panels 10, as well as vents or air relief valves to allow for efficient fluid flow, as discussed herein.

Because the configurable fluid receptacle 100 is comprised of the plurality of detachable structural panels 10, the configurable fluid receptacle 100 may be configured into different structures, depending on the geometry of each one of the plurality of detachable structural panels 10. For example, in FIG. 1, the configurable fluid receptacle 100 is configured to include a raised or elevated garden space 40. The garden space 40 may be created by a top surface 50 of the configurable fluid receptacle 100 that is recessed from top edges 52 of the side panels 14, where the side panels 14 form the perimeter of the top surface 50 of the configurable fluid receptacle 100. In the illustrated embodiment, soil may be placed in to a recessed area 54 created by the top surface 50 surrounded by walls formed by side panels 14, as shown. In other embodiments, the recessed area 54 may not be filled with soil to form the garden space 40, and instead may function as storage, such as shelving. A lid (not shown) may also be attached to the top edges 52 to form a drawer for storage space. In other embodiments, the configurable fluid receptacle 100 may be configured to form structures such as lawn chairs, shelves, and other structures as discussed herein.

Figure 2:
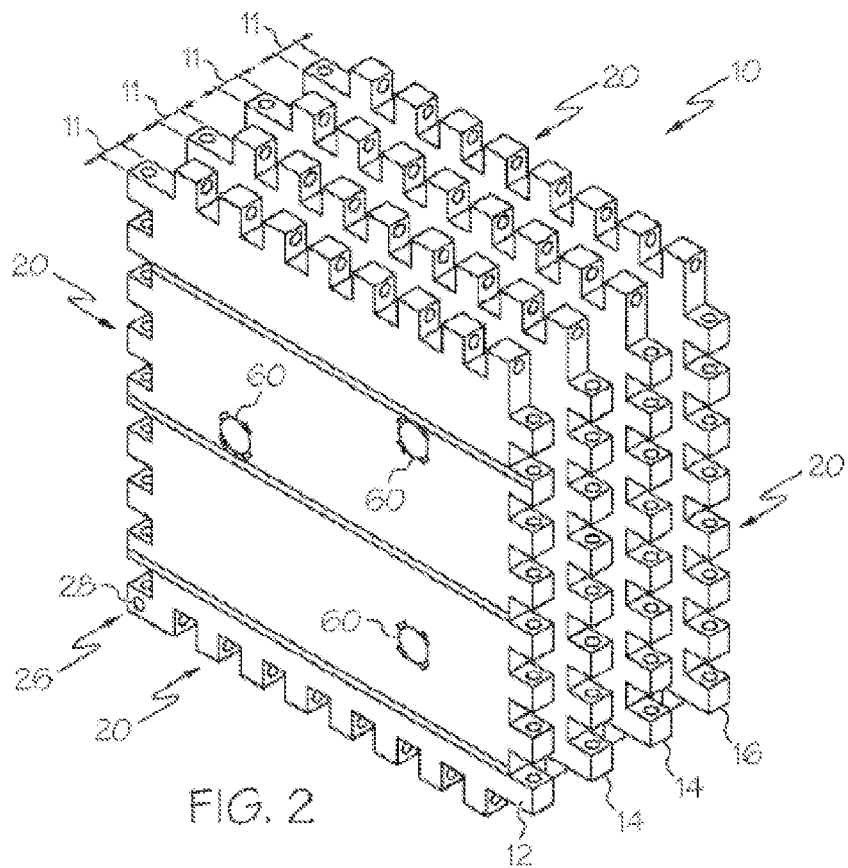
FIG. 2 depicts a perspective view of the plurality of detachable panels of FIG. 1 detached from one another according to one or more embodiments shown and described herein.

Referring now to FIG. 2, some of the plurality of detachable structural panels 10 that form the configurable fluid receptacle 100 are depicted detached from each other. Because the configurable fluid receptacle 100 is formed from detachable structural panels 10, the configurable fluid receptacle 100 may be assembled and disassembled, allowing for efficient transportation and/or shipping of the configurable fluid receptacle 100. Further, the shape and size of the configurable fluid receptacle 100 may be adjusted by including additional or fewer detachable structural panels 10 as desired. For example, if a user desires a configurable fluid receptacle 100 with increased storage capacity, the user may adjust the configuration of the configurable fluid receptacle 100 to include additional detachable structural panels 10. Likewise, if the user wishes to reduce the capacity or footprint of the configurable fluid receptacle 100, the user may remove detachable structural panels 10 from the configurable fluid receptacle 100.

In the illustrated embodiment, all of the detachable structural panels 10 have substantially similar thicknesses 11. The thicknesses 11 may be consistent across each detachable structural panel 10, allowing for the detachable structural panels 10 to be stacked upon each other. Stacking the detachable structural panels 10, regardless of the geometry of each individual detachable structural panel 10, may allow for reduced airspace required during shipping, which may result in reduced costs associated with shipping, storage, and/or transportation. The configurable fluid receptacle 100 may also be disassembled and stored by stacking the detachable structural panels 10, requiring a reduced amount of space to store the configurable fluid receptacle 100. In other embodiments, some of the detachable structural panels 10 may not have substantially the same thickness 11 or consistent thicknesses across the detachable structural panel 10, and in yet other embodiments of the configurable fluid receptacle 100, the detachable structural panels 10 may be different shapes and sizes. However, because the detachable structural panels 10 are detachable from each other, the configurable fluid receptacle 100 may be disassembled as desired and transported, shipped, or stored while requiring reduced airspace when compared to the assembled configurable fluid receptacle 100.

The detachable structural panels 10 further include attachment portions 60 that may extend through the thickness 11 of the detachable structural panels 10. Each detachable structural panel 10 may include several attachment portions 60 that allow users to attach the expandable internal bladder 30 to the detachable structural panel 10. The attachment portions 60 may have removable caps (not shown) that may allow any of the attachment portions 60 to become inlets or outlets for the expandable internal bladder 30. In instances where an individual attachment portion 60 is not being used as an inlet or an outlet for the expandable internal bladder 30, the attachment portion 60 may serve as an attachment point for the expandable internal bladder 30 to attach to an inner surface 19 of the detachable structural panel 10, which may provide structural support for the expandable internal bladder 30. The attachment portion 60 may allow the expandable internal bladder 30 to attach by, for example, a rotational locking mechanism, a snap fit mechanism, a ball and socket mechanism, or another mechanical attachment system.

Each of the orientation panels 12, side panels 14, and bottom panels 16, and top panels 18 are configured to interlock with each other with interlocking members 20, allowing for customization by a user in creating configurable fluid receptacles 100 of a desired size. Accordingly, the configurable fluid receptacle 100 may be configured to form different shaped structures and different sizes. Adding or removing detachable structural panels 10 from the configurable fluid receptacle 100 may adjust the size of the configurable fluid receptacle 100, while configuring the detachable structural panels 10 at various angles may form configurable fluid receptacles 100 of different structures, as discussed herein. For example, a user can configure the configurable fluid receptacle 100 to have a rectangular shape, a hexagonal shape, a diamond shape, and the like using rectangular detachable structural panels 10. In other embodiments, the configurable fluid receptacle 100 can be configured to form other shapes depending on the geometry of the detachable structural panels 10. Furthermore, some detachable structural panels 10 may be adjustable in size and geometry by including scorelines that allow users to snap sections of the detachable structural panel 10 off and change the size or geometry of the detachable structural panel 10, as discussed below.

Figure 3:
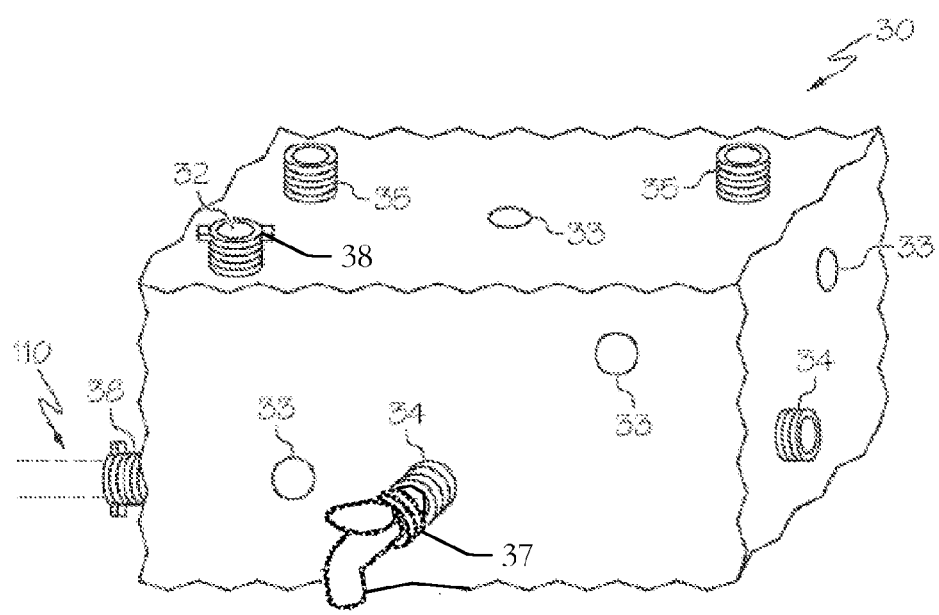
FIG. 3 depicts a perspective view of an expandable internal bladder according to one or more embodiments shown and described herein.
Figure 4:
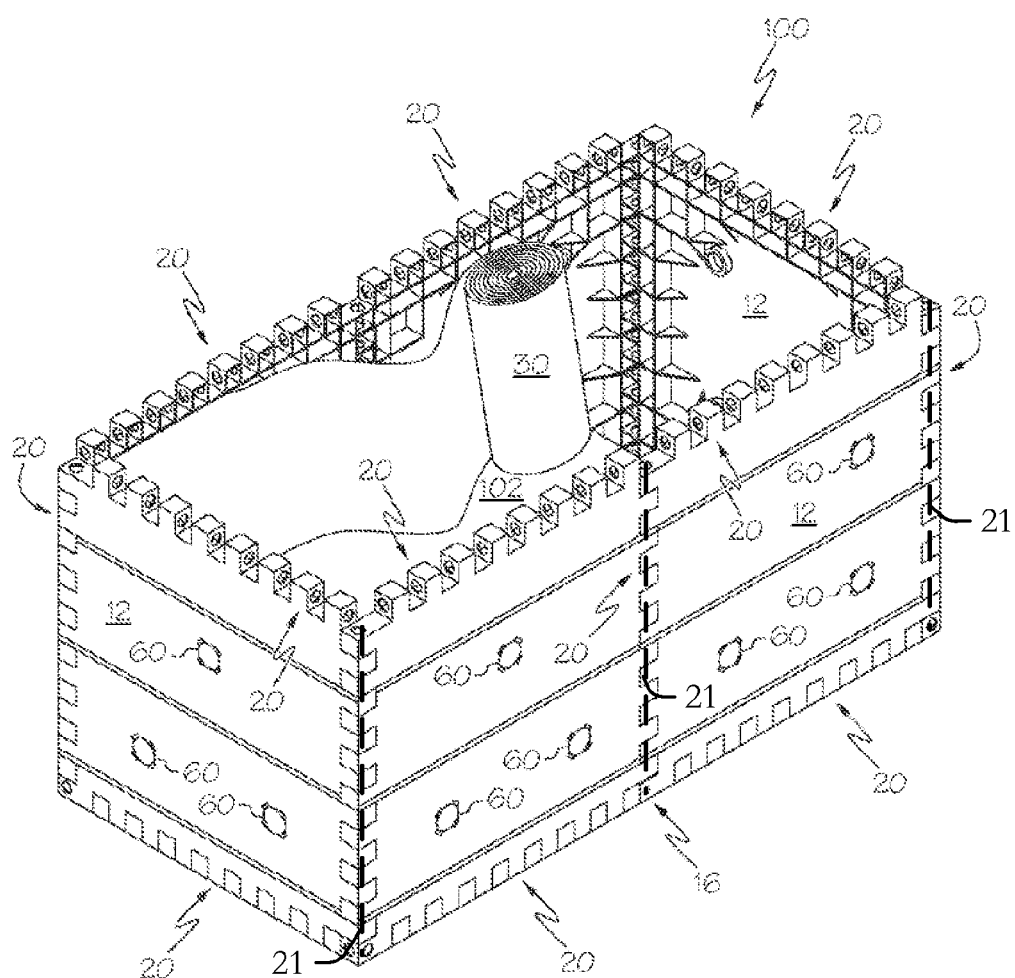
FIG. 4 depicts a perspective view of a partial alternative embodiment of a configurable fluid retention apparatus according to one or more embodiments shown and described herein.

Referring now to FIGS. 3 and 4, the expandable internal bladder 30 is shown in isolation in FIG. 3 and the expandable internal bladder 30 is positioned within the interior cavity 102 of the configurable fluid receptacle 100 in FIG. 4. In FIG. 4, the configurable fluid receptacle 100 is shown partially constructed, without side panels 14 and with bottom panels 16 in a raised position, partially forming the lower half of the configurable fluid receptacle 100 of FIG. 1. The expandable internal bladder 30 may include inlets 32, attachment devices 33, outlets 34, and air relief valves 35. The expandable internal bladder 30 may be formed from any material capable of fluid retention, such as plastic, canvas, leather, neoprene, and the like. The expandable internal bladder 30 may further be semi-rigid or flexible. In the illustrated embodiment, the expandable internal bladder 30 is comprised of plastic and is flexible, allowing the expandable internal bladder 30 to collapse upon itself or roll up for storage and/or transportation. The expandable internal bladder 30 includes multiple inlets 32 and outlets 34, allowing users to orient the expandable internal bladder 30 as desired and using as many or as few inlets 32 as necessary to deliver fluid to or remove fluid from the expandable internal bladder 30. The expandable internal bladder 30 may further include additional inlets and valves located at various positions on the expandable internal bladder 30, allowing flexibility in positioning the expandable internal bladder 30 in the interior cavity 102 in different configurations and also allowing the expandable internal bladder 30 to be reused when reconfiguring the configurable fluid receptacle 100. The inlets 32 and outlets 34 may be placed along any surface and at any height of the expandable internal bladder 30 and may include removable plugs (not shown) to prevent fluid flow into or out of the inlet when not in use. Each inlet 32 may further include a check valve, or a removable check valve may be included to position with the inlet being used. Similarly, the expandable internal bladder 30 may include additional outlets 34 positioned at various locations on the expandable internal bladder 30, allowing for fluid to be removed from the expandable internal bladder 30 from different outlets. In some embodiments, more than one inlet 32 may be used to deliver fluid to the expandable internal bladder 30, similarly, more than one outlet 34 may be used to remove fluid from the expandable internal bladder 30.

The attachment devices 33 may be integrated into the expandable internal bladder 30 or may be attached to the expandable internal bladder 30. The attachment devices 33 allow the expandable internal bladder 30 to be attached to the internal walls of the configurable fluid receptacle 100, providing the expandable internal bladder 30 with structure and allowing increased utilization of the internal volume of the expandable internal bladder 30 available for receiving fluid. The attachment devices 33 of the expandable internal bladder 30 attach to corresponding attachment openings on internal surfaces of the detachable structural panels 10, as discussed below. The attachment devices 33 may be complementary to the attachment portions 60 of the detachable structural panels 10, and may include features such as fins 38 (shown at mating faces of inlets 32) that allow the attachment devices 33 to attach to the attachment portions 60 of the detachable structural panels 10.

The expandable internal bladder 30 also includes the air relief valves 35. Air relief valves 35 may allow for airflow that may assist in removing fluid from the expandable internal bladder 30 through the outlet 34. As fluid flows from the expandable internal bladder 30 through the outlet 34, air passing through air relief valves 35 may allow fluid to flow more quickly at an increased flowrate by reducing internal pressure of the expandable internal bladder 30. Because the expandable internal bladder 30 may have a fixed volume, multiple expandable internal bladders 30 may be fluidly coupled and placed into the interior cavity 102 of the configurable fluid receptacle 100. For example, two expandable internal bladders may be fluidly coupled such that the outlet of the first expandable internal bladder is connected to the inlet of the second expandable internal bladder, thereby increasing the fluid retention capacity of the configurable fluid receptacle 100.

As fluid flows from the fluid delivery source 110 to the configurable fluid receptacle 100, the fluid reaches the inlet 32 of the expandable internal bladder 30. The fluid flows past the valve 36 and into the interior cavity of the expandable internal bladder 30. The outlet 34 may include the spout 37. In some embodiments, the spout 37 may be attached to the expandable internal bladder 30, while in other embodiments, the spout 37 may be attached to the configurable fluid receptacle 100 and the outlet 34 may be fluidly coupled to the spout 37. The spout 37 may be operable to open and close a valve allowing fluid to flow thorough the outlet. When a user desires to remove fluid from the expandable internal bladder, the user may operate the outlet 34 or spout 37 to open the valve. In some embodiments, the outlet 34 may comprise a flexible hose that may be joined to an external spout, for example, or other fluid delivery extensions that extend through one of the detachable structural panels 10 and allows fluid to be removed from the expandable internal bladder 30. In some embodiments, the inlet 32 may be positioned higher than the outlet 34, such that gravity will allow fluid to flow from the outlet. In other embodiments, pumps may be included to force fluid into or out of the expandable internal bladder 30, as discussed further below.

Referring now to FIG. 4, the configurable fluid receptacle 100 is depicted with side panels 14 and top panels 18 removed. The remaining plurality of detachable structural panels 10, in this case orientation panels 12 and bottom panels 16 (shown in a raised position), are shown interlocked with each other to form the lower portion of the configurable fluid receptacle 100. Each of the plurality of detachable structural panels 10 has interlocking members 20 that extend linearly along the perimeter of each of the plurality of detachable structural panels 10. The interlocking members 20 allow each of the detachable structural panels 10 to be positioned adjacent to each other and to interlock, forming, for example, a coplanar surface or a perpendicular corner, as shown in FIG. 4. The detachable structural panels 10 may also be positioned such that the detachable structural panels 10 interlock and form angular structures, such as hexagonal structures and the like. Also, depending on the geometry of the interlocked detachable structural panels 10, other structures may be formed by positioning detachable structural panels 10 adjacent to each other. As shown in FIG. 4, the expandable internal bladder 30 is positioned within the interior cavity 102 of the configurable fluid receptacle 100. Because the expandable internal bladder 30 may be flexible, the size and volume of the expandable internal bladder 30 may not correspond to the size and volume of the configurable fluid receptacle 100. Further, strengthening members 21 may be inserted through the interlocking members 20 to increase the structural rigidity of the configurable fluid receptacle 100. Strengthening members 21 may include plastic, metal, or wood rods/dowels, or other similar materials. In some embodiments (not shown) the configurable fluid receptacle 100 may be constructed substantially as shown in FIG. 4, and instead of an additional top layer being added to cover the configurable fluid receptacle 100, the expandable internal bladder 30 may be cut open and stretched across the configurable fluid receptacle 100 such that an open container is formed to receive, for example, rain water. A filter or a form of netting may be laid across the top to prevent debris from entering into the configurable fluid receptacle 100. This embodiment may be used in industrial environments or locations where rainfall may occur in high volumes, making direction of rain water through gutter or piping systems difficult.

Figure 5:
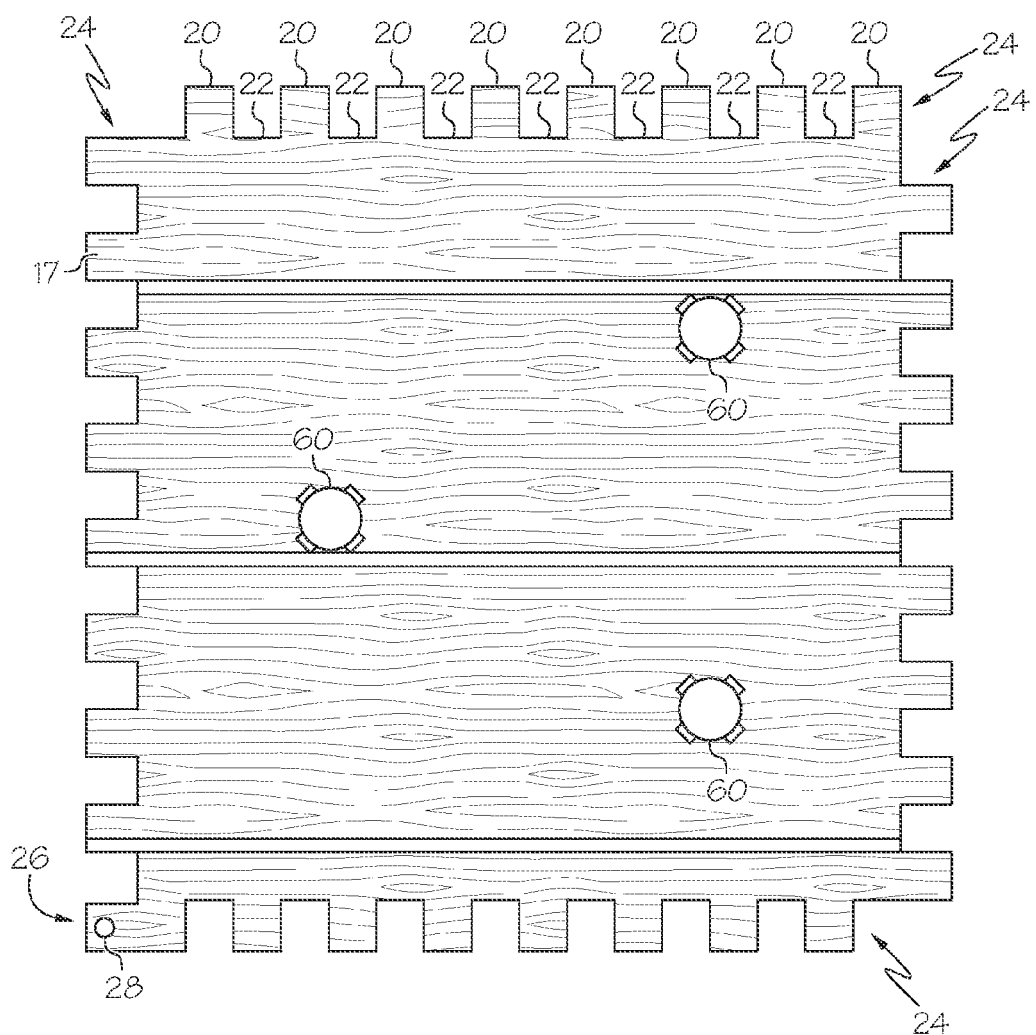
FIG. 5 depicts a front view of an orientation panel according to one or more embodiments shown and described herein.
Figure 6:
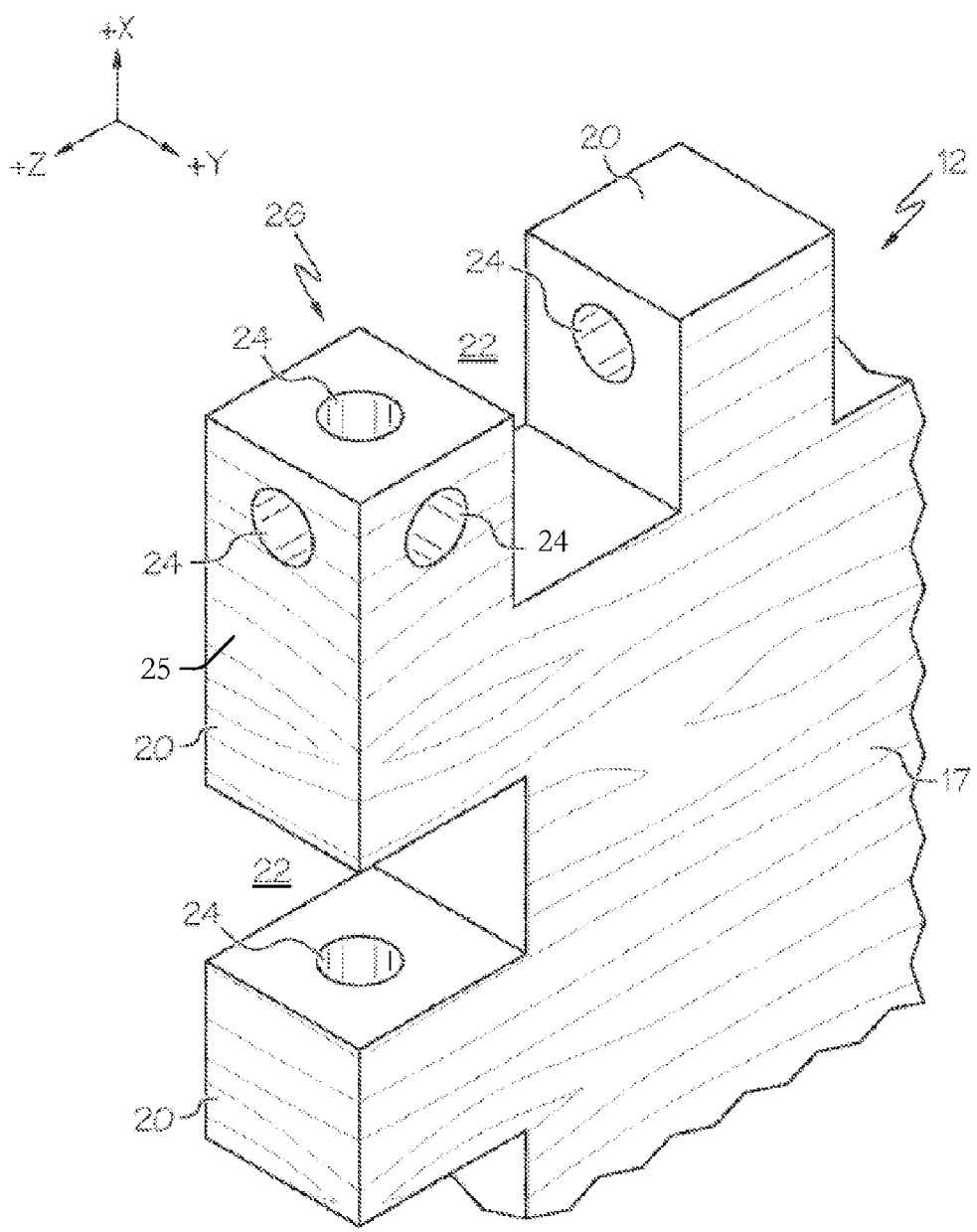
FIG. 6 depicts a perspective view of an orientation portion of the orientation panel of FIG. 5 according to one or more embodiments shown and described herein.
Figure 7:
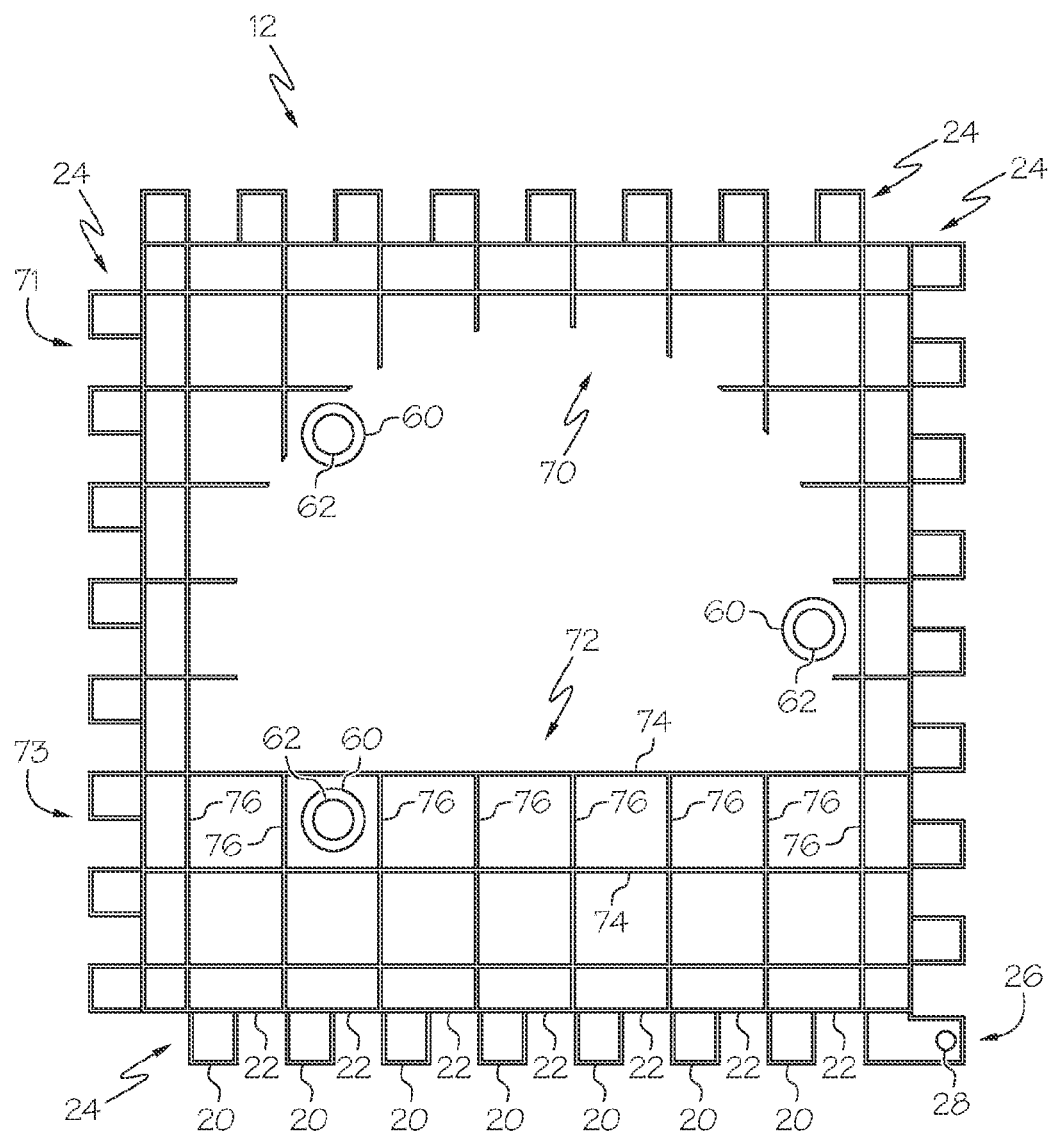
FIG. 7 depicts a rear view of the orientation panel of FIG. 5 according to one or more embodiments shown and described herein.

Referring now to FIGS. 5-7, one detachable structural panel 10, specifically one orientation panel 12, is depicted. The orientation panel 12 includes orientation corner 26, interlocking members 20, strengthening member openings 24, and attachment portions 60. In this embodiment, the interlocking members 20 have a rectangular geometry and extend linearly along the perimeter of the orientation panel 12. In other embodiments, the interlocking members 20 may have a different geometry, such as elliptical or curved geometries, and the interlocking members 20 may extend at angles along the perimeter of the orientation panel 12. The interlocking members 20 are spaced from one another to form gaps 22. In FIG. 5, only some of the gaps 22 between the interlocking members 20 are labeled for ease in illustration. Each gap 22 has substantially the same width as a single interlocking member 20. Accordingly, when the interlocking members 20 of one orientation panel 12 are positioned adjacent to another detachable structural panel 10, the interlocking members 20 of each detachable structural panel 10 fills a substantial entirety of the corresponding gap 22 on the adjacent detachable structural panel 10. The interlocking member 20 may fit into the corresponding gap 22 with, for example, a friction fit, a snap fit, an interference fit, or the like. The interlocking members 20 may have strengthening member openings 24. The strengthening member openings 24 may be of different geometries, as discussed herein. The strengthening member openings 24 may be transverse to an outer surface 17 of the detachable structural panel 10. Strengthening members 21, such as plastic or metal rods as discussed above, may be inserted through the strengthening member openings 24 to provide structural rigidity and to prevent the detachable structural panels 10 from separating or becoming detached.

The orientation panel 12 further includes attachment portions 60. Some embodiments may optionally include removable covers 62, as shown in FIG. 7. The attachment portions 60 may be openings that extend through the orientation panel 12 or may be positioned on an inner surface of the orientation panel 12. The attachment portions 60 may allow the attachment devices 33 of the expandable internal bladder 30 to be attached to the orientation panel 12 at the attachment portions 60, or may allow for the fluid inlet 32 connection or fluid outlet 34 connection. The orientation panel 12 has outer surface 17 that is textured and/or stylized to resemble wood grain. The outer surface 17 may be configured to resemble different textures and/or patterns, which may provide aesthetic appeal to users. In some embodiments, a graphical image may be applied to the outer surface 17, such as a sticker or a painting, while in other embodiments panels may be molded to achieve this aesthetic appeal. This may allow users additional flexibility in incorporating the configurable fluid receptacle 100 into existent landscaping, for example, and may allow the configurable fluid receptacle to blend into the natural surroundings. For example, the configurable fluid receptacle 100 may be configured to resemble natural stones or boulders, adding novelty to the configurable fluid receptacle 100. Other embodiments may have printed features on the outer surface 17 that likewise provide aesthetic appeal.

Referring now to FIG. 6, the orientation corner 26 of the orientation panel 12 is depicted in detail. The orientation corner 26 allows the orientation panel 12 to be properly oriented when configuring the configurable fluid receptacle 100. The orientation corner 26 is unlike the remaining corners of the orientation panel 12 in that the orientation corner 26 is comprised of two interlocking members 20 that are normal to each other. The orientation corner 26 includes strengthening member openings 24 along the X-axis, Y-axis, and Z-axis as shown in FIG. 6, allowing the orientation panel 12 to form corners of the configurable fluid receptacle 100 and also to receive strengthening members (not shown) that extend through the orientation panel 12. Because the orientation corner 26 includes two interlocking members 20, the orientation corner 26 may increase the structural rigidity of the configurable fluid receptacle 100.

The orientation corner 26 of the orientation panel 12 may be positioned such that a lateral edge 25 forms part of the bottom surface of the configurable fluid receptacle 100. Accordingly, the orientation corner 26 ensures that the orientation panels 12 may only be oriented in a certain configuration. Additionally, the orientation corner 26 may allow for specific supporting rib structures 70, 72 on inner surface 19 of the orientation panel 12 to be used that may be configured to reduce the amount of material used to form the orientation panel 12. For example, referring to FIG. 7, the orientation panel 12 is shown in rear view. Because the orientation corner 26 will be positioned at the bottom of the configurable fluid receptacle 100, supporting rib structure 72 may include supporting ribs 76 that extend vertically and supporting ribs 74 that extend horizontally across substantially an entire lower portion 73 of the orientation panel 12, while supporting rib structure 70 along an upper portion 71 may not extend along the entire upper portion 71 of the orientation panel 12. The additional supporting rib structure 72 may increase the strength and resist deformation of the orientation panel 12 as additional detachable structural panels 10 are attached to the orientation panel 12. The reduced amount of supporting rib structure 70 along the upper portion 71 of the orientation panel 12 may decrease production costs and times and decrease complexity of forming molds and apparatuses, which may increase yield and manufacturing performance. In the illustrated embodiment, the orientation panel 12 has one orientation corner 26, while in other embodiments, the orientation panel 12 may have multiple orientation corners distinguishable from each other. Finally, although the orientation panel 12 is illustrated in FIGS. 5-7, the features described herein may apply to any of the detachable structural panels 10, including side panels 14, bottom panels 16, and top panels 18.

Figure 8:
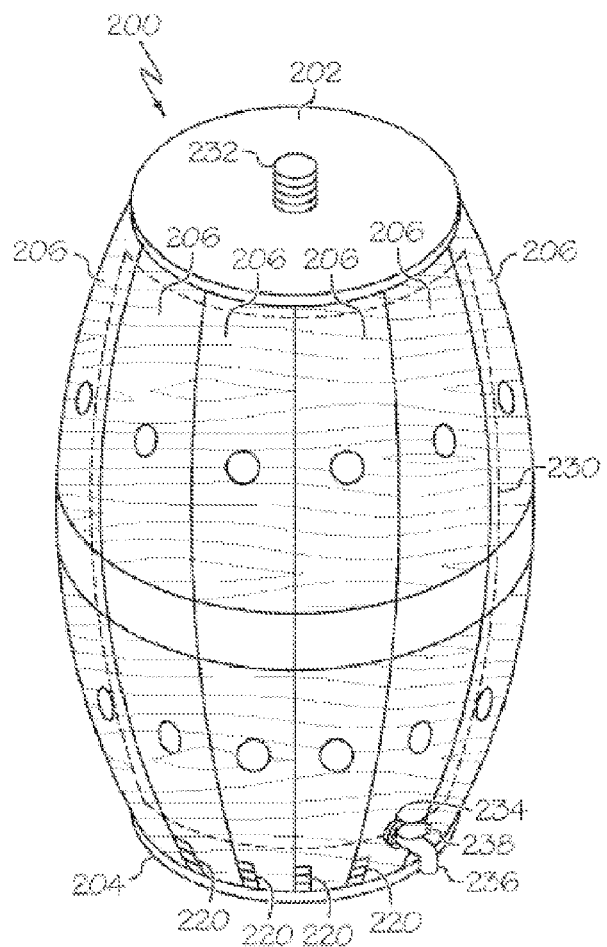
FIG. 8 depicts a perspective view of an alternative embodiment of a configurable fluid retention apparatus according to one or more embodiments shown and described herein.
Figure 9:
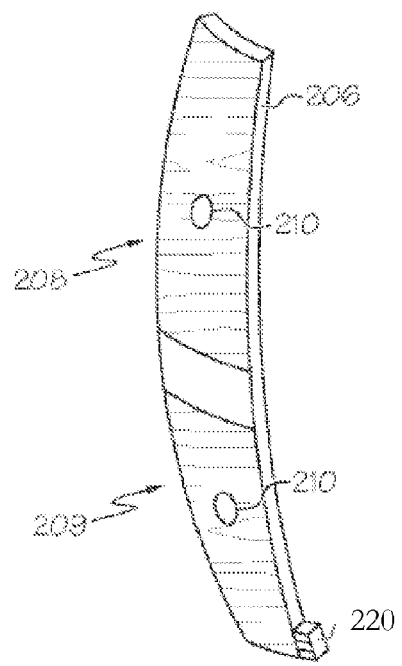
FIG. 9 depicts a perspective view of one curved detachable panel according to one or more embodiments shown and described herein.

Referring now to FIGS. 8 and 9, an alternative embodiment of a configurable fluid receptacle 200 is depicted. In this embodiment, the configurable fluid receptacle 200 is comprised of curved detachable structural panels 206 with non-planar contours configured to resemble a wine barrel. Each of the curved detachable structural panels 206 has an outer surface 208 that may be constructed to resemble, for example, wood grain or wood grain texture for aesthetic purposes, as shown. This may be achieved using, for example, a graphical image or a molding process. The detachable structural panels 206 may include attachment portions 210 and orientation portions 220. The attachment portions 210 may allow an internal bladder 230 to be attached to an interior surface 209 of the detachable structural panel 206. Additionally, when not in use, the attachment portions 210 may have removable caps (not shown) that cover the attachment portions 210. The orientation portion 220 may allow each detachable structural panel 206 to be oriented properly such that the orientation portion 220 is positioned near a bottom surface 213 of the configurable fluid receptacle 200.

The configurable fluid receptacle 200 may further include top panel 202 and bottom panel 204. In this embodiment, the detachable structural panels 206 are not of uniform geometry and dimension and have non-planar contours. However, the curved detachable structural panels 206 are stackable, which may result in the reduced storage space discussed above, as well as reduced shipping costs. Further, the configurable fluid receptacle 200 includes inlet 232 on the top panel 202 and outlet 234 near the bottom surface 213, allowing fluid to enter and flow through the internal bladder 230 by gravity. The outlet 234 may be connected to a spout 236 or other valve that allows users to release fluid from the internal bladder 230, for example, via a control device 238. Finally, because the detachable structural panels are uniquely shaped in this embodiment, the interior cavity 240 formed by the configurable fluid receptacle 200 may be of fixed volume.

Figure 10:
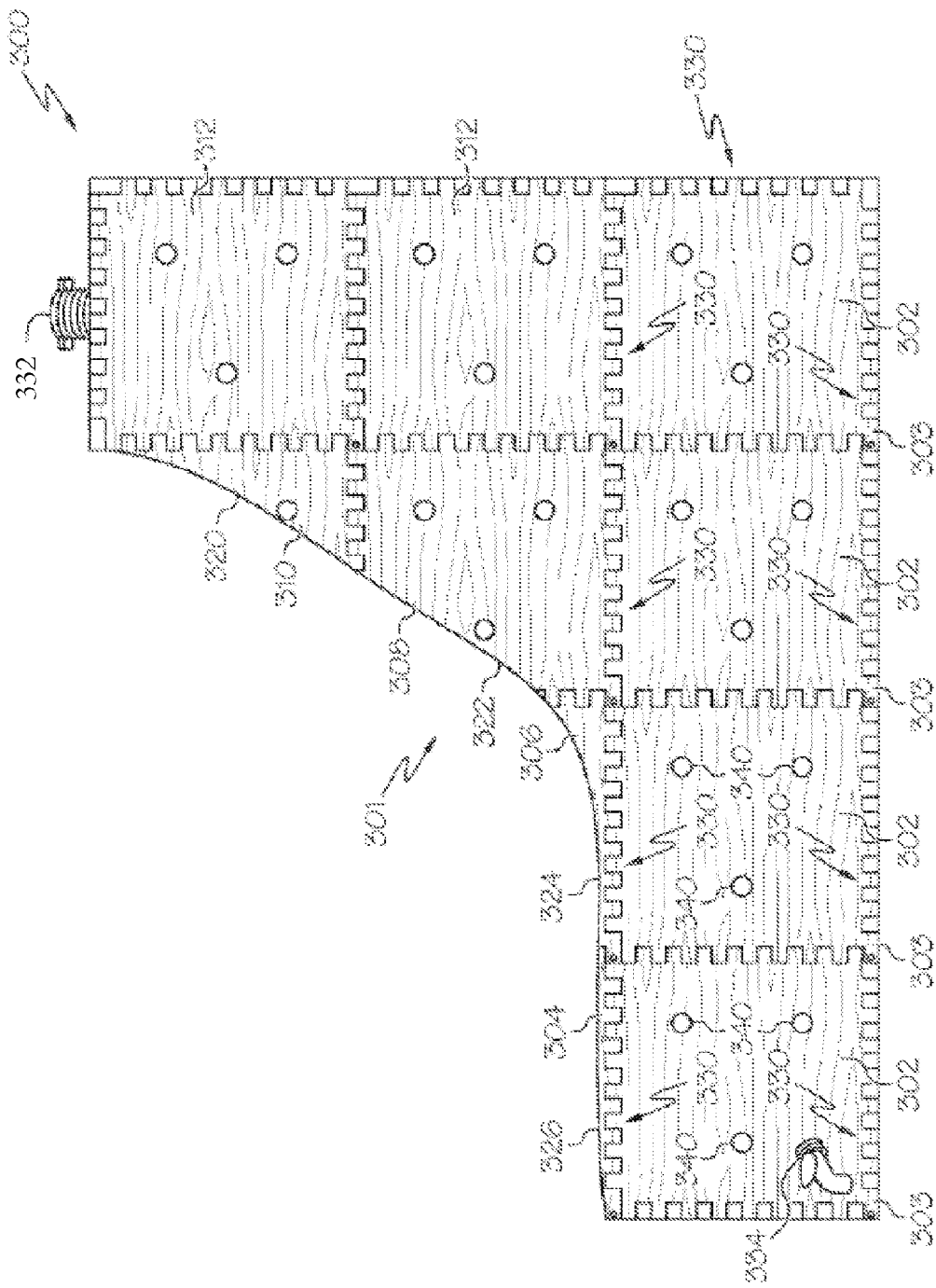
FIG. 10 a perspective view of an alternative embodiment of a configurable fluid retention apparatus according to one or more embodiments shown and described herein.

Referring now to FIG. 10, an alternative embodiment of a configurable fluid receptacle 300 forming a lawn chair is depicted. This embodiment is constructed of detachable panels of various sizes and geometries, and may include an inlet 332 to receive fluid and a spout 334 to dispense fluid. The configurable fluid receptacle 300 may include orientation panels 302, side panels 312, and adjustable panels 304, 306, 308, 310. The orientation panels 302 may each include respective orientation portions 303 and variable connection openings with removable covers 340. Some of the detachable panels may be joined at interlocking interfaces 322. The orientation panels 302 and side panels 312 function as described herein, however, the adjustable panels 304, 306, 308, 310 may include respective score lines 320, 322, 324, 326 that allow users to bend-and-snap the respective adjustable panel 304, 306, 308, 310 to form different shapes out of rectangular panels by applying a torque to the adjustable panel 304, 306, 308, 310 along the respective scoreline 320, 322, 324, 326. For example, adjustable panel 308 that forms the seat of the lawn chair in this embodiment may have a curved score line 322 along a corner of the adjustable panel 308 that allows the user to change the geometry of the adjustable panel 308 if desired. Because the geometry change is optional, the adjustable panel 308 still ships and otherwise operates as a side panel 312, resulting in the benefits described herein.

Figure 11:
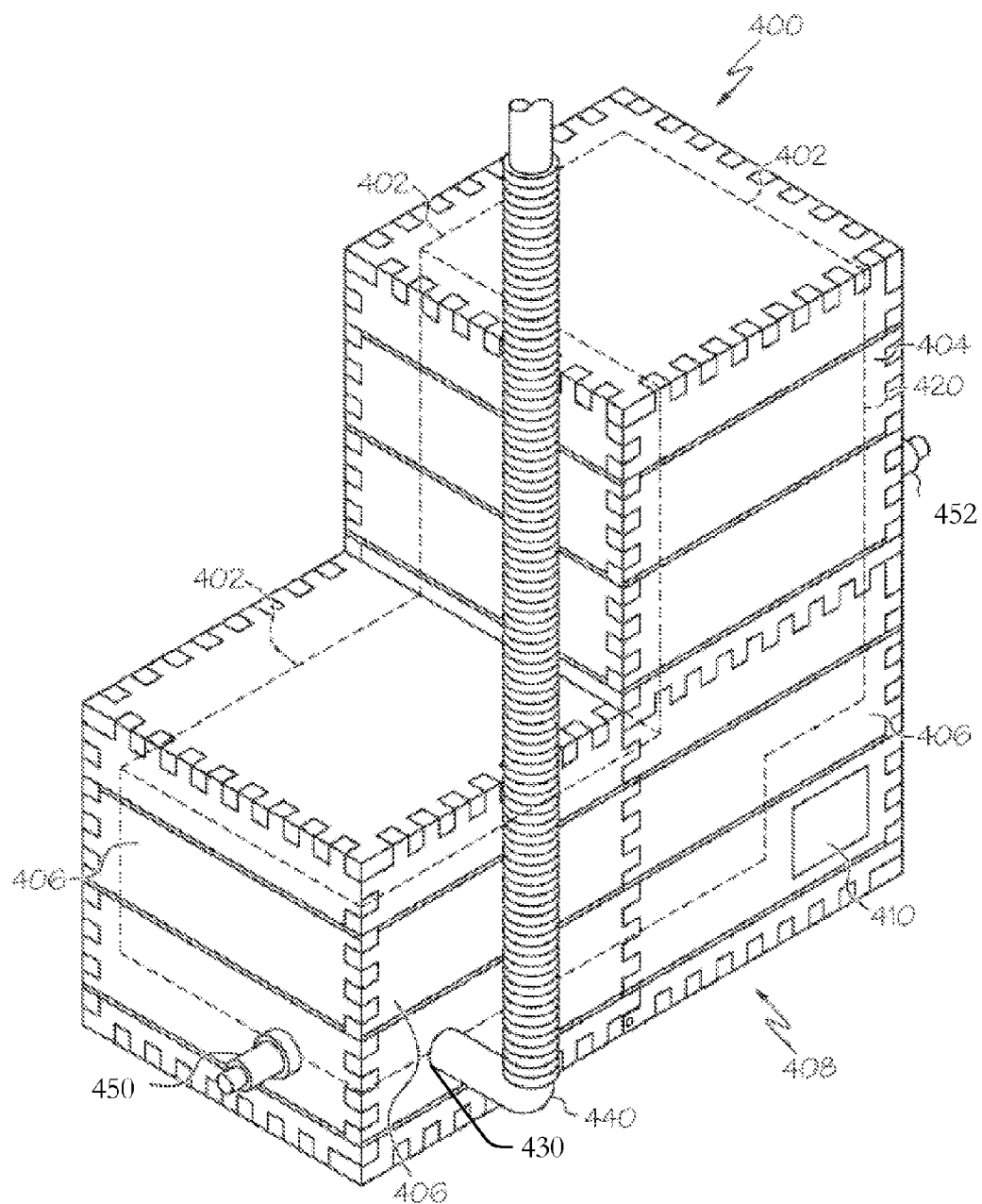
FIG. 11 a perspective view of an alternative embodiment of a configurable fluid retention apparatus according to one or more embodiments shown and described herein.

Referring now to FIG. 11, a stacked embodiment of a configurable fluid receptacle 400 is illustrated. In this embodiment, the configurable fluid receptacle 400 includes orientation panels 406, side panels 404, top panels 402, and bottom panels 408. The configurable fluid receptacle 400 further includes a pump 410 positioned inside the interior cavity 412 formed by the configurable fluid receptacle 400. In other embodiments, the pump 410 may be positioned external to the configurable fluid receptacle 400. The configurable fluid receptacle 400 further includes inlet 430 and outlets 450, 452. The inlet 430 may deliver fluid to an expandable internal bladder 420 positioned in the interior cavity 412 from a fluid delivery source 440, while fluid may be removed from the expandable internal bladder 420 through outlets 450, 452. The pump 410 may pump fluid up through elevated outlets, such as elevated outlet 452 in FIG. 11. In this embodiment, top surfaces 403 may serve as shelving for storage.

The above-described disclosure may allow for fluid tanks to be configured to different shapes, sizes, and capacities. The configurable fluid receptacles described herein may be easy to ship and handle due to detachable structural panels that detach from one another and may be stackable. Expandable internal bladders may receive and retain fluid delivered to the configurable internal bladders and fluid may be removed from the expandable internal bladders through outlets, which may be fluidly coupled to spouts. Some embodiments may include pumps to remove fluid from the expandable internal bladder. If desired, additional expandable internal bladders may be fluidly coupled and positioned inside the configurable fluid receptacles described herein in order to increase fluid volume capacity. Finally, the configurable fluid receptacles described herein may be comprised of detachable structural panels that have aesthetically pleasing outer surfaces, such as wood grain texture or printing, allowing the configurable fluid receptacle to mesh with other outdoor landscaping.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A configurable fluid retention apparatus comprising:

a plurality of detachable panels comprising an orientation panel with an orientation portion, the plurality of detachable panels configured to interlock with each other to form an outer structure of the configurable fluid retention apparatus, each of the plurality of detachable panels comprising an interior face with a first portion of rib support and a second portion of rib support, the first portion of rib support comprising longitudinal and lateral rib supports extending across the entire first portion, and the second portion of rib support comprising rib support only along an edge of the second portion;

an internal bladder positioned within an interior cavity of the configurable fluid retention apparatus and secured to at least one of the plurality of detachable panels, the internal bladder comprising an intake connection, an outlet connection, and an air relief device;

an intake valve fluidly coupled to the internal bladder at the intake connection and configured to allow unidirectional fluid flow; and an outlet valve fluidly coupled to the internal bladder at the outlet connection, the outlet valve passing through one of the plurality of detachable panels;

wherein:

each of the plurality of detachable panels comprises:

a plurality of interlock members and interlock gaps of substantially equal widths positioned along a perimeter of each detachable panel, the interlock members extending from a body of the detachable panel;

a plurality of variable connection openings extending through the body of each detachable panel; and the orientation portion, of the orientation panel comprises a first interlock member extending from the body of the orientation panel in a first direction, a second interlock member extending from the first interlock member of the orientation panel in a second direction that is perpendicular to the first direction, wherein:

the second interlock member comprises a first opening extending through the second interlock member along a first axis, a second opening extending through the second interlock member along a second axis perpendicular to the first axis and intersecting with the first opening, and a third opening extending through the second interlock member along a third axis perpendicular to both the first axis and the second axis, the third opening intersecting the first opening and the second opening; and the orientation portion is positioned at a corner of the orientation panel adjacent to the first portion of rib support, such that a longitudinal edge of one of the interlock members forms a portion of a bottom surface of the configurable fluid retention apparatus, and the first portion of rib support is positioned at a bottom of the orientation panel.

2. The configurable fluid retention apparatus of claim 1, wherein the plurality of detachable panels are comprised of plastic detachable panels.

3. The configurable fluid retention apparatus of claim 1, wherein each one of the plurality of detachable panels is substantially rectangular.

4. The configurable fluid retention apparatus of claim 1, wherein at least one of the plurality of detachable panels has a non-planar contour.

5. The configurable fluid retention apparatus of claim 1, wherein at least one of the plurality of detachable panels is curvilinear.

6. The configurable fluid retention apparatus of claim 1, wherein the plurality of detachable panels have external surfaces resembling wood grain.

7. The configurable fluid retention apparatus of claim 1, further comprising a strengthening member inserted through openings in the interlock members of adjacent detachable panels.

8. The configurable fluid retention apparatus of claim 1, wherein the supporting rib structure is asymmetrical.

9. The configurable fluid retention apparatus of claim 1, further comprising removable covers for the variable connection openings.

10. The configurable fluid retention apparatus of claim 1, further comprising a pump positioned within the interior cavity.

11. The configurable fluid retention apparatus of claim 1, wherein the detachable panels have an exterior surface resembling wood grain.

12. The configurable fluid retention apparatus of claim 1, wherein some of the plurality of detachable panels have predefined scorelines configured to modify a geometry of the detachable panel by removing a portion of the detachable panel.

13. A method for transporting a fluid comprising:

collecting a fluid in a feeding reservoir;

directing flow of the fluid using a fluid delivery apparatus; and receiving the fluid in a fluid retention apparatus, wherein the fluid retention apparatus comprises:

a plurality of detachable panels assembled to form an interior cavity, wherein one of the plurality of detachable panels is an orientation panel that comprises an orientation portion that ensures the detachable panel is oriented in a predetermined configuration, each of the plurality of detachable panels comprising an interior face with a first portion of rib support and a second portion of rib support, the first portion of rib support comprising longitudinal and lateral rib supports extending across the entire first portion, and the second portion of rib support comprising rib support only along an edge of the second portion;

strengthening members positioned between adjacent detachable panels; an internal bladder comprising an air relief device, an intake connection, and an outlet connection, the internal bladder positioned in the interior cavity and configured to retain the liquid;

an intake check valve fluidly coupled to the fluid delivery apparatus and the internal bladder; and an outlet valve fluidly coupled to the internal bladder and a spigot configured to adjust flow speed of the fluid; wherein fluid is unable to flow into the internal bladder when the internal bladder is at a predetermined capacity;

wherein the orientation portion of the orientation panel comprises a first interlock member extending from the body of the orientation panel in a first direction, a second interlock member extending from the first interlock member of the orientation panel in a second direction that is perpendicular to the first direction, wherein:

the second interlock member comprises a first opening extending through the second interlock member along a first axis, a second opening extending through the second interlock member along a second axis perpendicular to the first axis and intersecting with the first opening, and a third opening extending through the second interlock member along a third axis perpendicular to both the first axis and the second axis, the third opening intersecting the first opening and the second opening;

the orientation portion is positioned at a corner of the orientation panel adjacent to the first portion of rib support, such that a longitudinal edge of one of the interlock members forms a portion of a bottom surface of the configurable fluid retention apparatus, and the first portion of rib support is positioned at a bottom of the orientation panel.

14. The method for transporting a fluid of claim 13, wherein the plurality of detachable panels are stackable and have equal dimensions.

15. The method for transporting a fluid of claim 13, wherein the detachable panels have an exterior surface resembling wood grain.

16. The method for transporting a fluid of claim 13, wherein the fluid delivery apparatus is a gutter downspout.

17. The method for transporting a fluid of claim 13, further comprising modifying a geometry of one of the plurality of detachable panels by separating a portion of the detachable panel along a scoreline.

18. A configurable fluid retention apparatus comprising:

three stackable rigid panels, each rigid panel having a body with an exterior face and an interior face, interlock members each having two opposing openings of equal diameter, a first portion of rib support and a second portion of rib support on the interior face, the first portion of rib support comprising longitudinal and lateral rib supports extending across the entire first portion, and the second portion of rib support comprising rib support only along an edge of the second portion, and two variable valve position openings extending through the body of each stackable panel, wherein the exterior face of each stackable panel resembles wood grain and one of the rigid panels is an orientation panel that comprises an orientation portion;

a strengthening member inserted through the opposing openings of the interlock members along one side of two adjacent rigid panels;

a flexible internal bladder attached to two of the stackable rigid panels;

an intake check valve fluidly coupled to the internal bladder and passing through the body of one of the rigid panels;

an outlet valve fluidly coupled to the internal bladder and passing through the body of one of the rigid panels;

a fluid delivery apparatus fluidly coupled to the intake check valve; and a feeding reservoir fluidly coupled to the intake check valve;

wherein the orientation portion of the orientation panel comprises a first interlock member extending from the body of the orientation panel in a first direction, a second interlock member extending from the first interlock member of the orientation panel in a second direction that is perpendicular to the first direction, wherein:

the second interlock member comprises a first opening extending through the second interlock member along a first axis, a second opening extending through the second interlock member along a second axis perpendicular to the first axis and intersecting with the first opening, and a third opening extending through the second interlock member along a third axis perpendicular to both the first axis and the second axis, the third opening intersecting the first opening and the second opening;

the orientation portion is positioned at a corner of the orientation panel adjacent to the first portion of rib support, such that a longitudinal edge of one of the interlock members forms a portion of a bottom surface of the configurable fluid retention apparatus, and the first portion of rib support is positioned at a bottom of the orientation panel.

* * * * *